United States Patent [19]

Mielke

[11] 3,911,459
[45] Oct. 7, 1975

[54] AUTOMATIC AND MANUAL SETTING MEANS FOR PHOTOGRAPHIC DIAPHRAGMS

[75] Inventor: Bodo Mielke, Wolfenbuttel, Germany

[73] Assignee: Rollei-Werke Franke & Heidecke, Braunschweig, Germany

[22] Filed: Apr. 4, 1974

[21] Appl. No.: 457,807

Related U.S. Application Data

[63] Continuation-in-part of Ser. No. 335,914, Feb. 26, 1973, Pat. No. 3,812,501.

[30] Foreign Application Priority Data

Apr. 12, 1973 Germany............................ 2318432
Mar. 2, 1972 Germany............................ 2209913

[52] U.S. Cl................................. 354/273; 354/47
[51] Int. Cl.².................... G03B 9/07; G03B 7/02
[58] Field of Search........ 354/29, 30, 47, 272, 273, 354/38, 39

[56] References Cited
UNITED STATES PATENTS

| | | |
|---|---|---|
| 3,277,805 | 10/1966 | Starp.................................. 354/39 |
| 3,563,141 | 2/1971 | Starp.................................. 354/30 X |
| 3,578,765 | 5/1971 | Kobayashi......................... 354/30 X |
| 3,611,893 | 10/1971 | Starp.................................. 354/29 |

Primary Examiner—Samuel S. Matthews
Assistant Examiner—James LaBarre
Attorney, Agent, or Firm—Stonebraker, Shepard & Stephens

[57] ABSTRACT

A photographic diaphragm, the aperture of which may be set either manually or automatically. A stationary aperture scale is graduated in the usual conventional $f$ numerals plus the letter "A" at one end of the scale. A manually rotatable ring adjacent the scale carries an index mark which can be set opposite any graduation of the scale. A diaphragm drive ring which is mounted within the housing and not manually accessible in motor driven and carries a pointer movable along the same graduated aperture scale. When the manually settable ring is turned to move its index mark away from the A graduation signifying automatic setting, to any one of the numerically graduated aperture positions, a spring pressed mask obscures the pointer on the motor driven ring, so that the operator will not be confused by this pointer, and at the same time the movement of the manual ring away from the A position closes a switch which causes the motor driven ring to be driven to a position determined by an abutment stop on the manual ring. When the manual ring is turned to bring its index mark opposite the A position to indicate automatic operation, the mask is moved to a non-obscuring position so that the pointer on the motor driven ring can now be seen in relation to the aperture scale, and the switch is opened so that the driving motor no longer biases the motor driven ring toward the abutment on the manual ring, but merely moves the motor driven ring to the proper position for automatically setting the diaphragm aperture according to prevailing light conditions.

7 Claims, 4 Drawing Figures

AUTOMATIC AND MANUAL SETTING MEANS FOR PHOTOGRAPHIC DIAPHRAGMS

CROSS REFERENCE TO RELATED APPLICATION

This application is a continuation-in-part of application Ser. No. 335,914, filed Feb. 26, 1973, now U.S. Pat. No. 3,812,501, granted May, 21, 1974.

BACKGROUND OF THE INVENTION

It is well known in the art to provide a photographic camera with a diaphragm which is automatically set to an aperture appropriate to the prevailing light conditions (taking into account the shutter speed setting and the film speed or sensitivity) and a manual setting member which overrides the automatic setting and permits the operator to select for himself the desired diaphragm aperture. It is to this type of camera that the present invention relates.

It is an object of the invention to simplify the operation and particularly the switchover from automatic to manual diaphragm aperture selection or vice versa. and especially to simplify the reading of the aperture scale in such a way as to prevent mistaking an automatically set aperture for a manually set aperture.

SUMMARY OF THE INVENTION

The casing or housing of the diaphragm (usually containing also the lens and the objective shutter) has a circumferentially arranged diaphragm aperture scale graduated in the usual $f$ numerals, with the letter A (standing for automatic operation) at one end of the numerical scale. An internal diaphragm driving ring, not accessible for manual actuation, carries a pointer which sweeps over the scale. The disphragm leaves or blades are shifted to various aperture positions by rotation of this internal ring, which is motor driven. An external ring, manually rotatable, carries an index mark which, by manual rotation of the ring, may be brought opposite any desired graduation of the scale.

The manual ring carries an abutment, preferably in the form of a pin, which serves as a stop to limit the rotation of the motor driven ring in one direction, preferably in an aperture reducing direction. When the manual ring is turned to the A position, the abutment is out of the range of movement of the motor driven ring, so that the motor driven ring is free to move through its entire range, to set the diaphragm aperture to any value required by prevailing light conditions.

When the manual ring is turned to shift its index mark from the A graduation to any one of the numerical aperture graduations, this movement closes the switch which causes the drive motor to tend to drive the motor driven ring against the abutment on the manual ring, regardless of prevailing light conditions, so that it is now the position of the manual ring which determines the diaphragm aperture, rather than the light conditions.

It is advantageous to indicate clearly and conspicuously whether the disaphragm aperture is being set automatically or manually at any given time, so that the operator will not mistakely believe that the diaphragm aperture is the result of manual pre-selection when actually it is being set automatically, or vice versa. Accordingly, another feature of the invention is the provision of a mask which covers and obscures the pointer on the motorized drive ring whenever the manual ring is in an aperture-controlling position. The mask is moved to its obscuring position by spring means. A cam on the manual ring moves the mask to non-obscuring position, against the force of the spring means, when the manual ring moves from the last numerical graduation of the aperture scale to the A graduation thereof.

BRIEF DESCRIPTION OF THE DRAWINGS

FIG. 1b is a transverse section taken approximately on the line 1b—1b of FIG. 1a;

FIG. 2b is a transverse section taken approximately on the lines 2b—2b of FIG. 2a.

DESCRIPTION OF THE PREFERRED EMBODIMENT

Figure 1A:
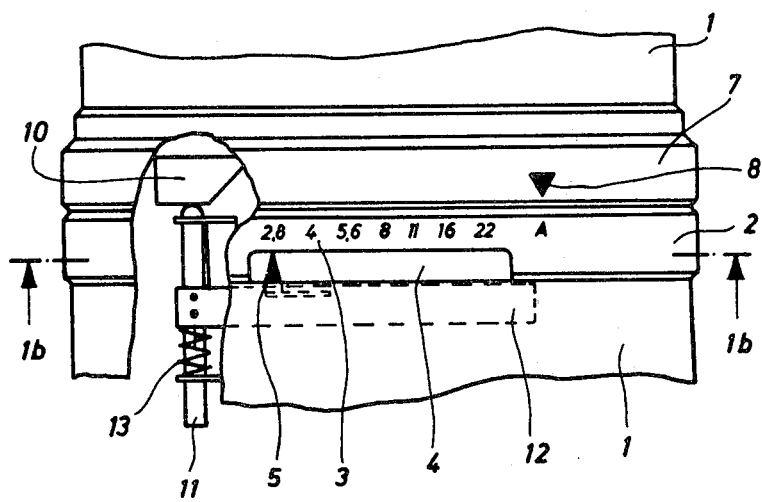
FIG. 1a is a schematic fragmentary plan of the diaphragm housing with parts broken away to show interior parts, the mechanism being set for automatic diaphragm actuation.

The diaphragm housing or casing indicated in general at 1 has a fixed or stationary circumferential ring 2 on which the diaphragm aperture scale 3 is marked. Preferably the scale is graduated in the usual numerical diaphragm aperture values, such as 2.8, 4, 5.6, etc. At one end of the scale, preferably the small aperture end (beyond the smallest aperture graduation 22) there is a further graduation A standing for automatic operation.

Extending through the entire length of the numerical graduations, but not as far as the graduation A, there is a window or opening 4. The window opening is preferably covered by a transparent sheet. Beneath this window 4, and visible through it except when obscured by a mask described below, is a pointer 5, preferably brightly colored or otherwise conspicuously formed, mounted on an arm attached to the diaphragm drive ring 6 which serves, upon rotation, to move the diaphragm leaves or blades to increase or decrease the size of the diaphragm aperture. The diaphragm leaves and the way they are operatively connected to the drive ring 6 to be moved thereby, are conventional and well known in the art.

The drive ring 6 is motor driven. The drive motor is preferably not a rotary motor, but is preferably a linear motor comprising a pot-shaped magnet and a cylindrical coil movable axially through a narrow gap at one end of the magnet, in response to flow of current through the turns of the coil, as disclosed in my U.S. Pat. 3,724,350, granted Apr. 3, 1973, and in my co-pending application Ser. No. 335,914, of which the present application is a continuation-in-part. The flow of current through the coil is controlled by an electrical bridge circuit not here shown but disclosed in my above mentioned application Ser. No. 335,914, to which reference is made for further details. The entire disclosure of my application Ser. No. 335,914 is incorporated herein by reference.

A manual setting ring 7 is rotatable circumferentially on the exterior of the housing 1, so that it may be easily grasped and rotated manually. It contains an index mark or reference point 8, which may be brought, by rotation of the ring, opposite anyone of the graduations of the scale 3. Within the housing the ring 7 carries an abutment member, such for example as the pin 9 fixed to the ring and extending in an axial direction, that is, in a direction parallel to the optical axis. When the manual ring 7 is turned so that the mark 8 is opposite the graduation A at one end of the aperture scale, then the pin 9 is out of the range of travel of the pointer arm 5 on the motor driven ring 6, and the motor driven ring is free to turn through its full range. Also in this position of the manual ring 7, the abutment member 9 engages a switch arm of the electrical switch 14 and holds this switch in open position, for a purpose further described below.

Figure 1B:
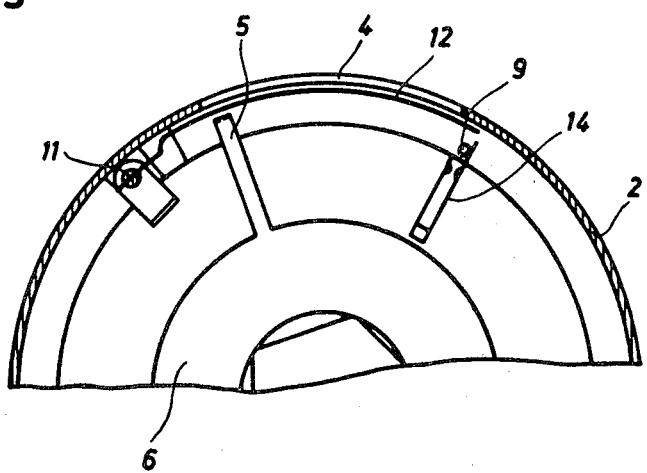

In addition to the abutment portion 9, the manual ring 7 also carries, at a point within the housing, a cam portion 10 having a rise in an axial direction, that is, in a direction parallel to the optical axis. When the manual ring 7 is in the A position illustrated in FIGS. 1a and 1b, the cam 10 is opposite the end of a plunger 11 which is mounted within the casing for movement parallel to the optical axis, and which is pressed by a spring 13 in a direction against the cam 10. This plunger 11 carries an arcuate mask 12 which, in the position illustrated in FIGS. 1a and 1b, is offset from the window 4 so that it does not obscure or obstruct the pointer 5, which can be plainly seen.

When the manual ring 7 is displaced leftwardly to bring the index mark 8 away from the graduation A and opposite one of the numerical graduations of the scale, and cam 10 is moved out of alignment with the plunger 11, so that the spring 13 moves the plunger forwardly, and carries the arcuate mask 12 to a position directly beneath the window 4, thereby masking or obscuring the pointer 5 on the motor driven ring 6. Whenever the manual ring 7 is in any such position, with the mark 8 aligned with a numerical graduation rather than with the graduation A, the diaphragm aperture is set manually as selected by the operator, and the mask 12, by obscuring the pointer 5, helps to avoid possible confusion in the operator's mind, informing him conspicuously that he is now operating with manual preselection of the diaphragm aperture rather than with automatic diaphragm setting by prevailing light conditions. To assist in bringing this conspicuously to the attention of the operator, the upper side of the mask 12 can be lettered with an appropriate written legend, such as the word Manual or the like, which will show through the window 4 when the mask 12 is in its position obscuring the pointer 5.

Figure 2A:
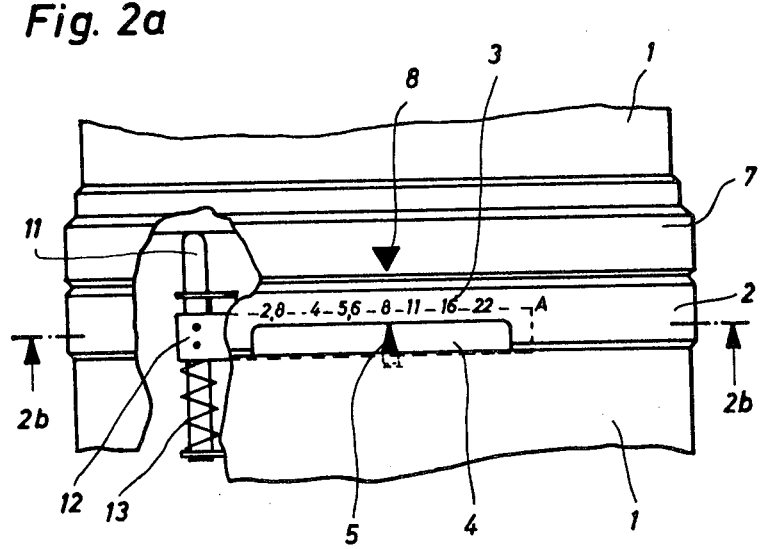
FIG. 2a is a view similar to FIG. 1a showing the parts set for manual selection of the diaphragm aperture.
Figure 2B:
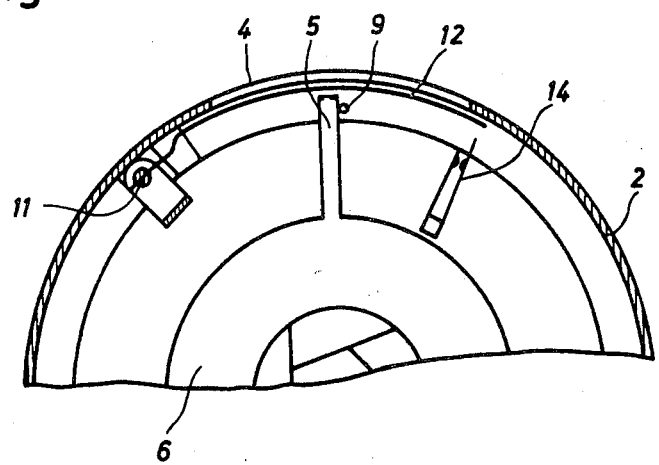

The movement of the manual ring 7 from automatic position to any one of the manual positions moves the abutment pin 9 away from the switch 14 so that the resilient switch arm closes the switch. This switch corresponds to the switch 18 in my application Ser. No. 335,914, and as explained in that application, the closing of this switch biases the electrical bridge circuit in such a way that the drive motor tends to drive the drive ring 6 in a direction to close the diaphragm aperture down to minimum aperture. That is, it tends to drive the ring 6 in a clockwise direction when viewed as in FIGS. 1b and 2b. However, the abutment member 9 serves as a stop to limit the extent of clockwise rotation of the drive ring 6. Hence the drive ring 6 comes to rest in the position determined by the manual setting of the manual ring 7.

When the manual ring 7 is returned to its automatic setting position, the cam 10 acts on the pin 11 to move the mask 12 to non-obscuring position relative to the window 4, and at the same time the abutment pin 9 opens the switch 14. Therefore, with this switch open, the electric circuit of the drive motor is responsive to the amount of light falling on the photo-electric converter (element 15 in my application Ser. No. 335,914) and so the drive motor sets the diaphragm aperture according to the prevailing light conditions, under the control of the balancing electrical bridge, as explained in the prior application.

What is claimed is:

1. A photographic diaphragm having a variable aperture selectively settable either manually or automatically, comprising means forming an aperture scale graduated numerically and having a non-numerical graduation beyond one end of the numerical graduations, automatic aperture setting means including a driving member and a pointer coupled to said driving member to move therewith, said pointer being movable along the numerically graduated portion of said scale, a manual setting ring having an index mark movable along the entire scale upon rotation of said manual setting ring, and means responsive to the position of said manual setting ring for covering and obscuring said pointer when said manual setting ring is in a position for manual selection of the diaphragm aperture.

2. The invention claimed in claim 1, further comprising a housing containing said driving member and pointer, said scale being on the outside of said housing and said housing having a window alongside the numerically graduated portion of said scale, said pointer being visible through said window when said manual setting ring is in a position for automatic setting of the diaphragm aperture.

3. The invention claimed in claim 2, said responsive means including a movable mask for closing said window to prevent viewing said pointer through said window, and means responsive to the position of said manual setting ring for holding said mask in an ineffective non-obscuring position relative to said window when said manual setting ring is in a position for automatic setting of the diaphragm aperture and for holding said mask in an effective obscuring position relative to said window when said manual setting ring is in a position for manual selection of the diaphragm aperture.

4. The invention claimed in claim 3, said means for holding said mask a push rod mounted within said housing for axial movement in a direction parallel to an optical axis of the diaphragm, said mask being mounted on said push rod to move therewith.

5. The invention claimed in claim 4, further comprising a spring tending to move said push rod axially in one direction, and cam means moving with said manual setting ring for moving said push rod axially in the opposite direction against the force of said spring.

6. The invention as claimed in claim 2, said responsive means including a mask movable between obscuring and non-obscuring positions relative to said window, and cam means mounted on said manual setting ring for shifting said mask from one to the other of its said positions.

7. The invention as defined in claim 6, further comprising a spring tending to move said mask to its obscuring position, said cam means moving said mask to its non-obscuring position against the force of said spring when said manual setting ring is moved to a position denoting automatic adjustment of the diaphragm aperture.

* * * * *